United States Patent

[11] 3,563,575

[72] Inventor Richard Ayshford Sanford
 Broadway, Worcestershire, England
[21] Appl. No. 772,920
[22] Filed Nov. 4, 1968
[45] Patented Feb. 16, 1971
[73] Assignee The Tungum Company Limited
 Cheltenham, England
[32] Priority Nov. 9, 1967
[33] Great Britain
[31] 50,966

[54] PIPE COUPLINGS
 1 Claim, 1 Drawing Fig.
[52] U.S. Cl. ................................................ 285/323,
 285/343
[51] Int. Cl. ........................................ F16l 21/06
[50] Field of Search ................................. 285/322,
 323, 324, 342, 343, 348, 382.7, 354, 386, 389,
 349, (O-ring), 95, 304—334, 335—343

[56] References Cited
 UNITED STATES PATENTS
3,011,807 12/1961 Cowdrey ............... 285/382.7X

| 2,452,277 | 10/1948 | Woodling ............ | 285/343 |
| 2,463,707 | 3/1949 | Matousek ............ | 285/382.7X |
| 2,466,526 | 4/1949 | Wolfram ............ | 285/342X |
| 2,585,453 | 2/1952 | Gallagher et al. ...... | 285/341 |

FOREIGN PATENTS

| 380,035 | 9/1932 | Great Britain ........ | 285/323 |
| 880,495 | 10/1961 | Great Britain ........ | 285/342 |

Primary Examiner—Dave W. Arola
Attorney—Young & Thompson

ABSTRACT: A pipe coupling comprising a body with a bore adapted to receive the pipe as a sliding fit and formed with a recess for an O-ring to encircle and seal against the pipe. A nut threaded on the body has an internal wedge surface, and a longitudinally split pipe-gripping collar encircles and grips the pipe and has an external wedge surface which is complementary to and cooperates with the wedge surface in the nut. The external wedge surface on the collar is relieved intermediate the ends of the collar, by a rectangular-section annular groove so as to decrease the area engaging the nut without decreasing the effective overall length of the wedge surface.

PATENTED FEB 16 1971
3,563,575
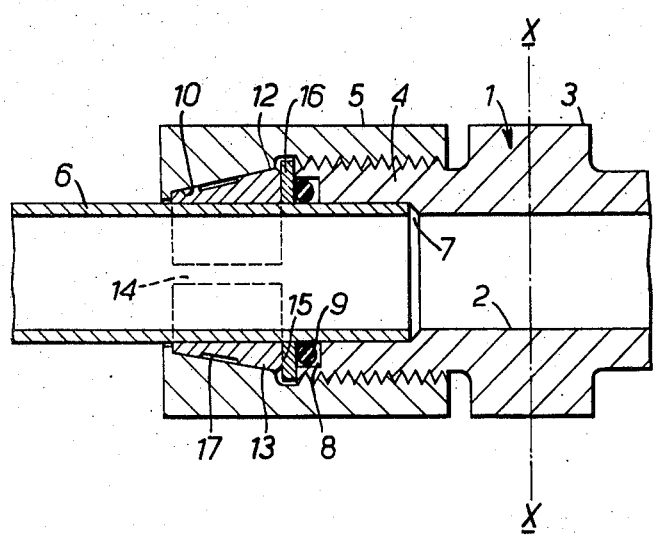
INVENTOR
RICHARD AYSHFORD SANFORD
BY
Young + Thompson
ATTORNEYS

PIPE COUPLINGS

This invention relates to pipe couplings of the type comprising a body, a sealing ring which provides a seal between the pipe and body, a pipe-gripping collar and a nut which is threaded on to the body and tightened to contract the collar radially on to the pipe due to the coaction of wedge surfaces formed respectively on the collar and in the nut.

In order to provide an adequate pipe-gripping force to withstand the axial thrust of a high internal hydraulic pressure it is necessary to form the cooperating collar and nut wedge surfaces with a relatively fine taper, for example of the order 11°. As a result there is a tendency for the collar to wedge in the nut, which renders its removal difficult and also causes it to turn excessively on the pipe as the nut is tightened with resultant damage to the pipe. With couplings for hydraulic applications it is normally a requirement that they should be capable of being made and broken repeatedly without damage to the end of the pipe, and the object of the invention is to provide a coupling with a pipe-gripping collar which has a materially decreased tendency to turn with the nut.

According to one aspect of the invention a pipe coupling comprises a body with a bore adapted to receive the pipe as a sliding fit and formed with a recess for an O-ring to encircle and seal against the pipe, a nut threaded on the body with an internal wedge surface, and a longitudinally split pipe-gripping collar adapted to encircle and grip the pipe and with an external wedge surface which is complementary to and cooperates with the wedge surface in that nut, the external wedge surface on the collar being relieved to decrease the area engaging the nut without decreasing the effective overall length of the wedge surface.

As a result of the decreased area of contact between the nut and the collar the tendency for the latter to bind in the nut is reduced, but as the effective length of the wedge surface is unchanged the same length of the collar is operative to grip the pipe and hence the gripping action is not substantially impaired. The outer wedge surface of the collar may be relieved by machining an intermediate annular groove to provide for the surface two lands which engage the nut, but it will be appreciated that the collar may be relieved in other ways while still fulfilling the objects of the invention.

According to another aspect of the invention a pipe coupling comprises a body, a sealing ring to provide a seal between the body and a pipe inserted into the body, a coupling nut threaded on to the body and formed with an internal wedge surface, and a pipe-gripping collar which is longitudinally split and housed within the nut and has an external wedge surface which cooperates with the wedge surface in the nut, one of said wedge surfaces having one or more areas of relief.

A pipe coupling employing an externally relieved collar in accordance with the present invention desirably also employs a thrust washer which encircles the pipe and is positioned between the inner end of the collar and the outer end of the coupling body. Even with the collar relieved one can expect a slight tendency for the collar to turn with the nut as the latter is finally tightened, and the provision of a thrust washer prevents any chance of the collar damaging the end of the body should it turn with the nut. This is particularly important with a hydraulic coupling which must be capable of being made and broken repeatedly without damage or impairment of the coupling efficiency.

The invention will now be further described with reference to the accompanying drawing which show, by way of example and in longitudinal axial section, a pipe coupling in accordance with the invention and for connecting together two high pressure hydraulic pipes in line. The coupling shown in the drawings is identical to that disclosed in our copending Patent application No.

The coupling has a body 1 with a through bore 2 and a central portion 3 of external hexagonal shape on either side of which the body projects by way of externally threaded tubular extensions which are aligned and coaxial with the bore 2. As the coupling is symmetrical about a transverse line X–X, only one extension is shown in the drawing and designated 4, and the succeeding description refers mainly to the left-hand part of the coupling shown in the drawing. A coupling nut 5 which is threaded on the extension 4 can be tightened to grip one of the two pipes 6 pushed into the bore 2 with respect to which it is a sliding fit, and the hexagonal shape of the central body portion 3 enables the body 1 to be held against rotation by means of a spanner or the like as the nut 5 is tightened. The bore is stepped, being of smaller diameter over a central section somewhat longer than the central body portion 3, and the resultant step 7 limits the insertion of the pipe 6 into the body 1.

The outer end of the extension 4 is flat and counterbored at 8 to provide a recess in which is housed a resilient O-ring 9, and the relative dimensions of the counterbore 8 and O-ring 9 are such that the latter has a degree of axial freedom and is an interference fit radially with respect to the wall of the counterbore 8 and the outer surface of the pipe 6 to provide an effective seal against internal hydraulic pressure.

At its outer unthreaded end the nut 5 has an internal wedge surface 10 with a taper of approximately 11° facing towards the body 1, and the surface 10 engages a complementary external wedge surface 12 on an annular pipe-gripping collar 13 which surrounds the pipe 6. The collar 13 is longitudinally split as indicated at 14 throughout its length. The collar 13 has a flat end surface 15 which engages an annular thrust washer 16 of rectangular section which closely encircles the pipe 6 and abuts the end of the body extension 4. Thus the thrust washer 16 closes the counterbore 8 in which the O-ring 9 is housed and prevents the adjacent split end of the collar 13 damaging the body 1 in the event of the collar 13 turning with the nut 5 as the latter is tightened. The wedge surface 12 is relieved by means of an annular peripheral groove 17 disposed midway along the surface 12. This provides, in effect, two spaced lands which are disposed on respective sides of the groove 17 and which provide the wedging engagement with the nut 5.

I claim:

1. A pipe coupling comprising a body with a bore receiving a pipe as a sliding fit and formed with a recess having an elastic deformable member therein that encircles and seals against the pipe, a nut threaded on the body with an internal wedge surface, and a pipe-gripping collar that is longitudinally split throughout its length and that encircles and grips the pipe and that has an external wedge surface which is complementary to and cooperates with the wedge surface of the nut, the external wedge surface on the collar having an annular peripheral groove therein which is substantially wider than it is deep, said groove being disposed intermediate the ends of the wedge surface of the collar thereby to increase the gripping force of the collar on the pipe without substantially deforming the pipe.